March 22, 1966    B. C. WOLFE    3,241,456
ROTARY FLUID MOTOR
Filed Dec. 26, 1962    3 Sheets-Sheet 2

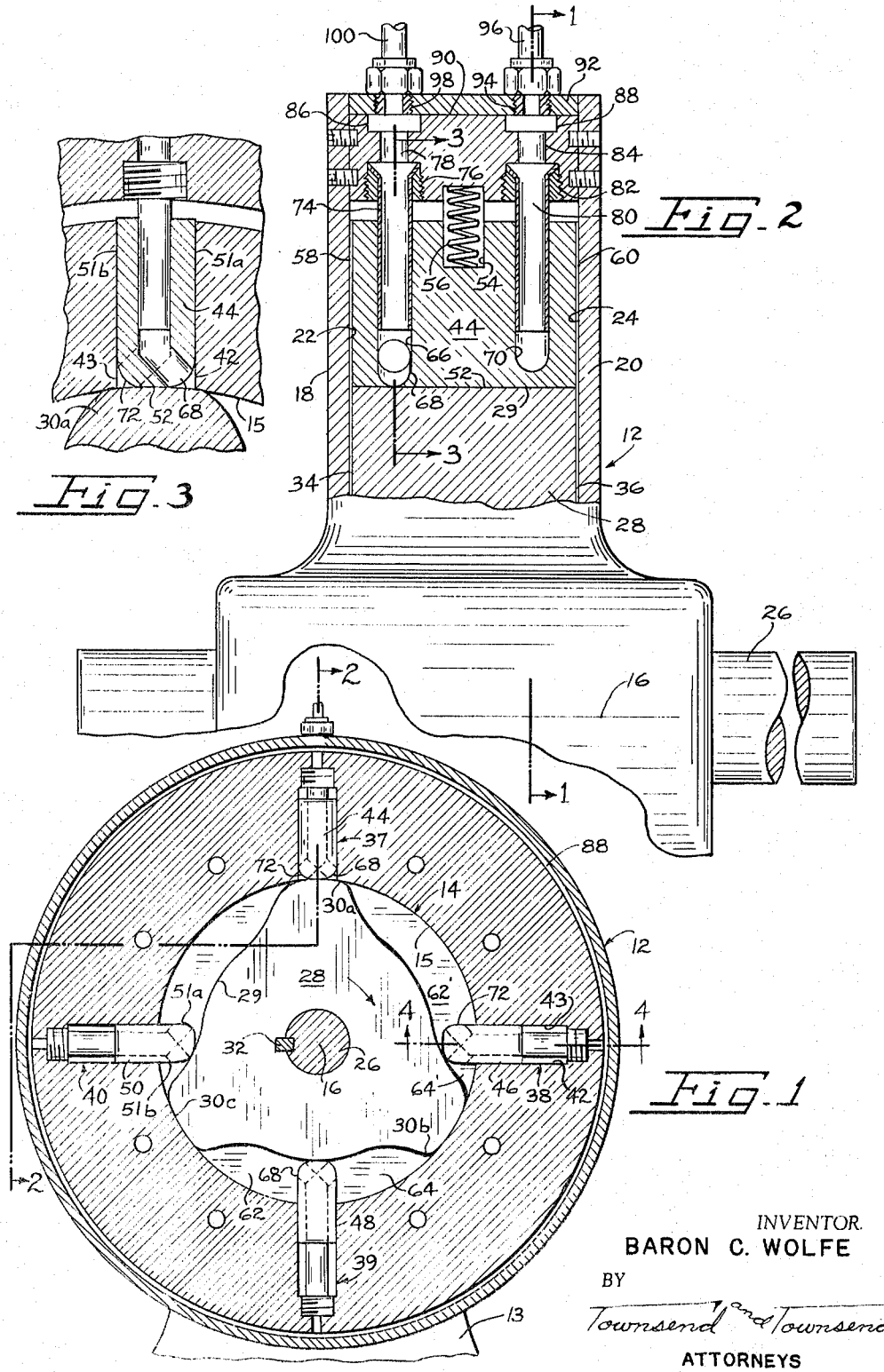

INVENTOR.
BARON C. WOLFE
BY
Townsend and Townsend
ATTORNEYS

March 22, 1966  B. C. WOLFE  3,241,456
ROTARY FLUID MOTOR
Filed Dec. 26, 1962  3 Sheets-Sheet 3

INVENTOR.
BARON C. WOLFE
BY
Townsend and Townsend
ATTORNEYS

United States Patent Office 3,241,456
Patented Mar. 22, 1966

3,241,456
ROTARY FLUID MOTOR
Baron C. Wolfe, 24 W. Grant St., Eureka, Calif.
Filed Dec. 26, 1962, Ser. No. 247,184
6 Claims. (Cl. 91—105)

This invention relates to rotary fluid motors and more particularly to such motors in which the moving parts are symmetrical about their axes of rotation to afford static and dynamic balance.

The embodiments of the invention to be described in detail hereinafter generally include an inner lobed body mounted on a shaft in a casing, which casing has an internal surface adapted to cooperate with lobes on the lobed body to effect a fluid seal therebetween in order to form a fluid compartment between adjacent lobes on the inner lobed body. Sliding vanes extend from the internal casing surface and bear against the periphery of the lobed body to divide the above mentioned compartments into a power compartment and an exhaust compartment. Application of pressurized fluid to the power compartment causes rotation of the lobed body relative the casing. As convenience dictates, either the lobed body or the casing can be fixed, and there is described in detail hereinbelow various techniques for conveying the fluid to and from the compartments to accommodate either mode of operation.

A feature and advantage of the motor of the present invention is that substantial torque at very low rotational speed is produced. This feature and advantage is realized because torque is provided to the rotating member during the full 360° of rotation thereof. Thus, the devices of this invention lend themselves admirably to gearless drive units.

Another feature and advantage of the present invention is that the rotating member is symmetrical around the axis of rotation so as to afford balanced operation with very little vibration. The foregoing characteristic makes possible the construction of motors of large size and high torque rating.

Still another feature and advantage is that motors made according to the present invention are extremely versatile in that the casing can be fixed and power taken from a shaft connected to the inner lobed body or the shaft can be fixed and power taken from the rotating casing.

An object of the invention is to provide a system of conduits and passages for conveying fluid to and from the motor. One specifically described system is adapted for a motor in which the inner lobed body rotates; one system of conduits and passages is adapted for a motor in which the external casing rotates about a fixed shaft and inner lobed body.

These and other objects, features and advantages will be apparent upon referring to the following specification and attached drawings in which:

FIGURE 1 is a side view in cross section, taken along line 1—1 of FIGURE 2, of a motor according to my invention wherein the outer casing is fixed and the inner lobed body rotates relative thereto;

FIGURE 2 is an enlarged view taken substantially along line 2—2 of FIGURE 1;

FIGURE 3 is a cross sectional view taken along line 3—3 of FIGURE 2;

Figure 4:
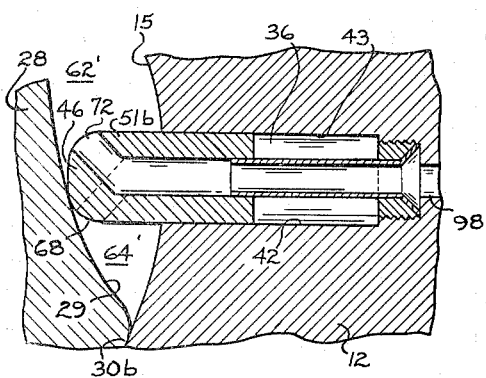
FIGURE 4 is an enlarged cross sectional view taken along line 4—4 of FIGURE 1.

Referring more particularly to the drawings, reference numeral 12 indicates generally a casing supported on a base 13 and forming a chamber 14 having an internal arcuate surface 15 that is formed symmetrically relative a central axis 16. Chamber 14 is completed by provision of end closure plates 18 and 20 that have smooth opposing interior surfaces 22 and 24, respectively. The interior surfaces are each formed symmetrically with respect to axis 16. Suitably journaled on end plates 18 and 20 is a shaft 26 that extends through chamber 14 and is coaxial with axis 16. Disposed in chamber 14 is an inner lobed body 28 having a smooth peripheral surface 29 formed with three uniformly spaced lobes 30a, 30b and 30c, each having a peripheral surface formed for non-contacting fluid sealing cooperation with internal arcuate surface 15. For the purpose of the present specification and the following claims, the term "non-contacting fluid-sealing" is intended to define a relation between two surfaces wherein the surfaces do not contact one another but are sufficiently close to prevent fluid from passing therebetween. Such phenomenon is well known to those skilled in the art of hydraulic and fluid equipment; a clearance between two surfaces of .0005 inch affords a non-contacting fluid-sealing relationship between the surfaces.

Shaft 26 and lobed body 28 are provided with keyways for receiving a conventional key 32 to affix the body to the shaft. Lobed body 28 has smooth side surfaces 34 and 36 that are symmetrical about axis 16 and are adapted for non-contacting fluid-sealing relation with surfaces 22 and 24, respectively, which relation is exaggerated in FIGURE 2 for clarity.

Formed in casing 12 are four uniformly spaced radially extending slots 37, 38, 39 and 40, each being formed with two flat opposing parallel side surfaces 42 and 43 (see FIGURE 3). Slidably mounted in respective slots are vanes 44, 46, 48 and 50, each formed with opposing side faces 51a and 51b for slidably engaging slot surfaces 42 and 43, thereby to reciprocally retain the vanes. Each vane is formed at the outer end 52 thereof with a smooth surface for bearing in fluid-sealing relation against peripheral surface 29 of inner lobed body 28; each vane has on the inner end thereof a hole 54 for receiving a compression spring 56 that serves to bias end surface 52 of each vane against the peripheral surface of the lobed body. Each of the vanes has opposing side surfaces 58 and 60 adapted for non-contacting fluid-sealing relation with inside surfaces 22 and 24 of chamber closure plates 18 and 20.

Referring to vane 48 of FIGURE 1, it is seen that a compartment 62 is formed on one side thereof, bounded by a vane face, arcuate surface 14, and peripheral surface 29; and that a compartment 64 is formed on the opposite side of vane 48, bounded by a vane face, the arcuate surface and the peripheral lobed body surface. Similar compartments are formed on opposite sides of the other vanes.

Because vanes 44, 46, 48 and 50 are substantially identical, the specific description of vane 44 to follow may be considered exemplary of the other vanes. Vane 44 is formed with a first fluid conduit 66, which conduit terminates in an orifice 68 in a side face of the vane, and is also formed with a second fluid conduit 70 terminating in an orifice 72 on the opposite vane face. Extending into conduit 66 is a tube 74 having an exterior surface in sliding fluid-sealing relation with conduit 66. Tube 74 is mounted in a threaded portion 76 of a passage 78 formed in casing 12. Extending into conduit 70 is tube 80 having an exterior surface for sliding fluid-sealing engagement with conduit 70. Tube 80 is mounted in a threaded portion 82 of a passage 84 in casing 12.

Passages 78 and 84 respectively communicate with first and second fluid ducts 86 and 88, which ducts are formed by providing casing 12 with an exterior cylindric surface 90, forming two spaced apart grooves in the exterior surface, and providing a band 92 circumscribing the casing for closing the grooves to form ducts 86 and 88. Band 92 is provided with a threaded opening 94 in communication with duct 88 for affixing a fluid pipe 96 thereto; band 92 is also provided with a threaded opening 98 in communication with duct 86 and having affixed thereto a fluid pipe 100. Fluid pipe 100 is attached to a conventional fluid pressure pump (not shown), and fluid pipe 96 is arranged in communication with a fluid reservoir (not shown) that supplies the fluid pressure pump to which fluid pipe 100 is attached. Thus, fluid under pressure is conveyed to each tube 74 through duct 86 and fluid is conveyed from tube 80 to pipe 96 through fluid duct 84.

In operation fluid under pressure is supplied through pipe 100 and emanates from orifice 68 in those vanes 44, 46, 48 and 50 which extend into chamber 15 from respective slots 37, 38, 39 and 40. Referring specifically to FIGURE 4, fluid under pressure is conveyed into compartment 64′, and because the only movable side of the compartment is formed by peripheral surface 29 of lobed body 28, the lobe will rotate in a clockwise direction as viewed in FIGURES 1 and 4. During such conditions, compartment 64′ is in a power phase since the action in the compartment applies torque to lobed body 28. At the same time, as best shown in FIGURE 1, compartment 62′ is in an exhaust phase in which residual fluid in the compartment from the previous power phase is exhausted through orifice 72 and conduit 70 in vane 46 to fluid duct 88. The exhaust phase continues as lobe 30a moves along arcuate surface 15 and terminates when lobe 30a arrives at a position near vane 46. While the foregoing transpires, vane 46 is maintained in contact with peripheral surface 29 due to the action of compression spring 56, which contact isolates compartments 62′ and 64′ from one another by reason of the bearing of vane end 52 on the peripheral surface.

Simultaneous with the above occurrences, fluid is being exhausted from compartment 64 which lies to the right, as viewed in FIGURE 1, of vane 48; compartment 62 is in a power phase at this time since fluid under pressure is being fed into the compartment through orifice 68 in vane 48. It will be obvious that the compartments on opposite sides of vane 50 will be in different phases during the afore-described period of time.

When a given lobe passes a vane, the compartments on opposite sides of that lobe will be in a neutral state. Such fact can be seen more clearly in FIGURE 3 in which orifices 68 and 72 are momentarily out of communication with the compartments on opposite sides of lobe 30a. Shortly after the neutral stage has been passed, orifice 72 of lobe 44 will be in a position clear of surface 43 of slot 37, and exhaust of the compartment will proceed. It is to be understood that, during the neutral stage at one vane position, torque is being provided from other compartments in the power phase.

Figure 6:
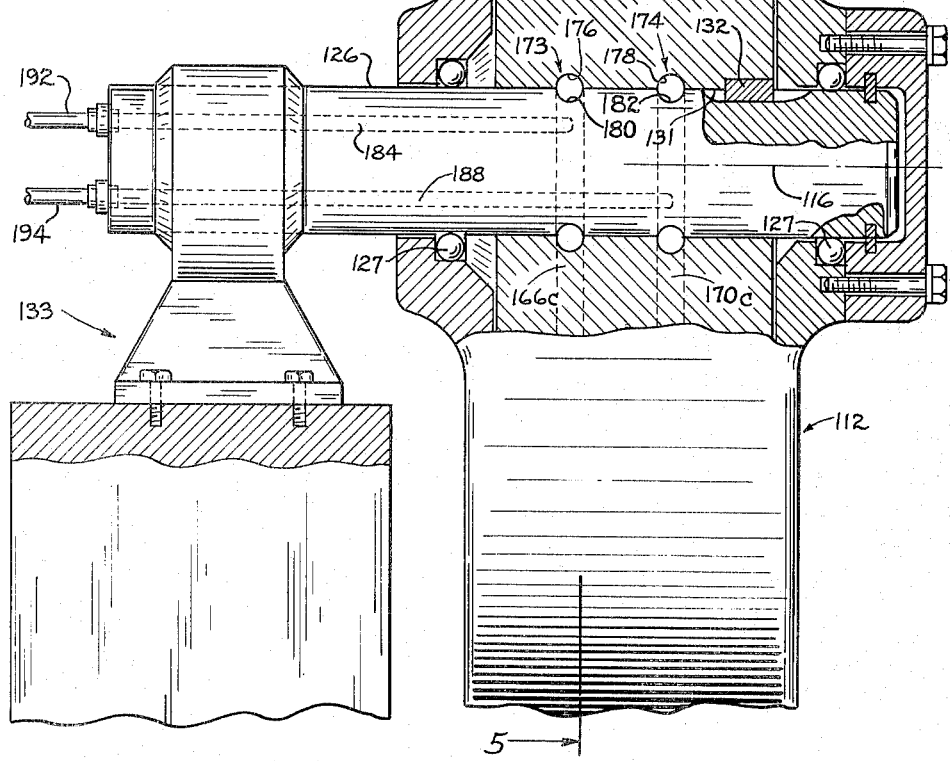
FIGURE 6 is an enlarged cross sectional view taken along line 6—6 of FIGURE 5.
Figure 5:
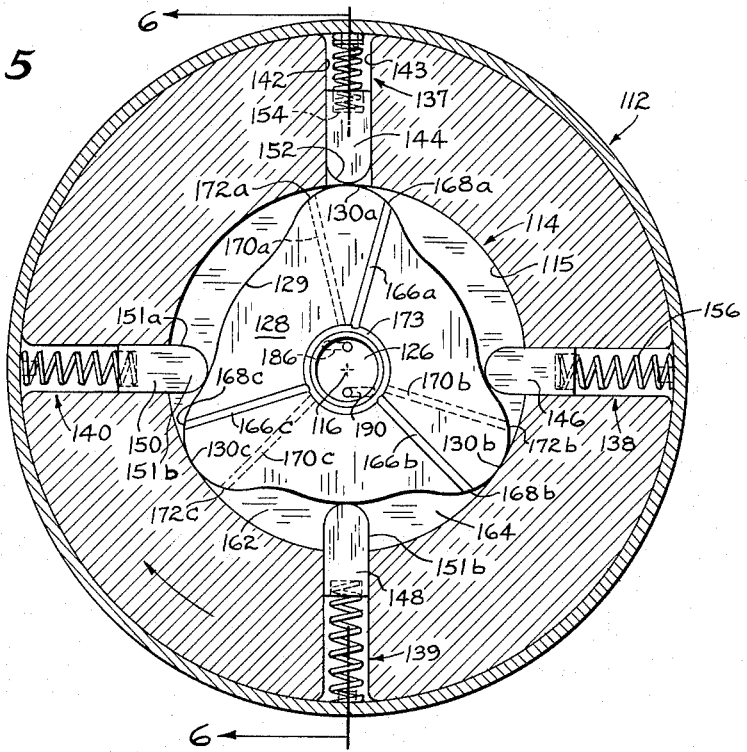
FIGURE 5 is a cross sectional side view of a motor of my invention having a fixed inner lobed body and an outer casing adapted for rotation relative thereto.

Referring now to FIGURES 5 and 6, a casing 112 is shown that forms a chamber 114 with an arcuate internal surface 115 that is symmetrical in respect to a central axis 116. Chamber 114 is completed by closing arcuate surface 115 with closure plates 118 and 120 that are formed with smooth opposing interior surfaces 122 and 124, respectively. Surfaces 122 and 124 are contoured symmetrically relative central axis 116. Casing 112 is suitably journaled for rotation about a shaft 126, which shaft is coaxial with central axis 116. Conventional anti-friction bearings 127 are provided on closure plates 118 and 120 to afford free rotation of the casing relative to the shaft. A lobed inner body 128 is disposed in chamber 114 and is formed with a smooth peripheral surface 129 which has three lobes 130a, 130b and 130c uniformly spaced apart therearound. The lobed body is formed with a central bore 131 for press fit on shaft 126; bore 131 and shaft 126 are suitably excised to receive a key 132 for affixing the lobed member to the shaft. Exterior of casing 112 a base 133 is provided for fixedly supporting shaft 126.

Lobed body 128 is formed with smooth side surfaces 134 and 135 that are symmetrical about axis 116 and are adapted for non-contacting fluid-sealing relation with surfaces 122 and 124 of chamber 114. The relation between the side lobe surfaces and the internal chamber surface is exaggerated in FIGURE 6 for clarity.

Formed in casing 112 are four uniformly spaced radially extending slots 137, 138, 139 and 140, each of which opens onto arcuate surface 115 and is provided with flat opposing parallel side surfaces 142 and 143. Slidably mounted in respective slots are vanes 144, 146, 148 and 150 each formed with opposing side faces 151a and 151b for slidably engaging slot surfaces 142 and 143, thereby to reciprocally retain the vanes in respective slots. Each vane has on the outer end 152 thereof a smooth surface for bearing in fluid-sealing relation against peripheral surface 129 of lobed body 128; the opposite end of each vane is formed with a hole 154 for receiving a compression spring 156 that biases the end of the vane 152 against the peripheral surface of the lobed body. Each of the vanes has opposing side surfaces 158 and 160 adapted for non-contacting fluid-sealing relation with opposing inside chamber surfaces 122 and 124 respectively.

It can thus be seen in FIGURE 5 that a compartment 162 is formed on one side of a vane bounded by a vane face, peripheral surface 129 and arcuate surface 115, and that on the opposite side of the vane a compartment 164 is similarly formed. Similarly, compartments on opposite sides of the other vanes are defined by a respective lobe face, arcuate surface 115, and peripheral body surface 129.

Lobed body 128 is formed in three fluid conduits 166a, 166b and 166c each terminating in peripheral surface 129 at orifices 168a, 168b and 168c respectively; each of the orifices is formed adjacent one of the lobes 130a, 130b and 130c on the same side of the respective lobe relative to the direction of rotation of casing 112. Similarly, lobed body 128 is formed with three fluid conduits 170a, 170b and 170c that terminate in peripheral surface 129 on the opposite side of the lobes at orifices 172a, 172b and 172c. Conduits 166a, 166b and 166c terminate in an annular conduit 173 in the center of the body and conduits 170a, 170b and 170c terminate in a similarly located annular conduit 174.

Annular conduits 173 and 174 are formed by providing spaced apart semi-circular depressions 176 and 178 around the interior surface of bore 131 of lobed body 128. The annular conduits are completed by providing semi-circular grooves 180 and 182 on the surface of shaft 126 disposed relative one another for registry with grooves 176 and 178, respectively. For communicating annular conduit 173 to the exterior of the motor, a passage 184 is formed in shaft 126 longitudinal thereto, and a radially extending passage 186 communicates passage 184 to annular conduit 173. Annular conduit 174 communicates with the exterior of the motor through a passage 188 formed longitudinally in shaft 126 and through a generally radial passage 190. The exterior end of passage 184 is adapted to receive a fluid pipe 192; passage 188 on its exterior end is adapted to receive a fluid pipe 194. Fluid pipe 192 is attached to a conventional fluid pressure pump (not shown), and fluid pipe 194 is arranged in communication with a fluid reservoir (not shown) that supplies the fluid pressure pump to which fluid pipe 192 is attached. Thus fluid under pressure is conveyed to each conduit 166a, 166b and 166c, and fluid is conveyed from each conduit 170a, 170b and 170c to fluid pipe 194.

In operation of this embodiment of my invention, fluid pressure supplied to fluid pipe 192 is delivered to orifices 168a, 168b and 168c on peripheral surface 129 of lobed body 128. Referring to FIGURE 5, fluid emanating from orifice 168b enters compartment 164 to exert pressure on face 151b of vane 148, thereby to move casing 112 in a clockwise direction. Similarly, pressure is exerted by the emanation of pressurized fluid from orifice 168c against the face of vane 150. Residual fluid in chamber 162 is expelled from the chamber through orifice 172c to fluid pipe 194, since clockwise rotation of casing 112 moves vane 148 toward the left as viewed in FIGURE 5. Due to the action of compression springs 156, each of the vanes is maintained in fluid-sealing contact with peripheral surface 129. As the various orifices pass vane ends 152, a neutral stage will momentarily exist during which no torque is exerted on the particular vane. The other compartments, however, supply torque during such neutral stage so as to assure torque on casing 112 during a full 360° of rotation thereof.

Figure 7:
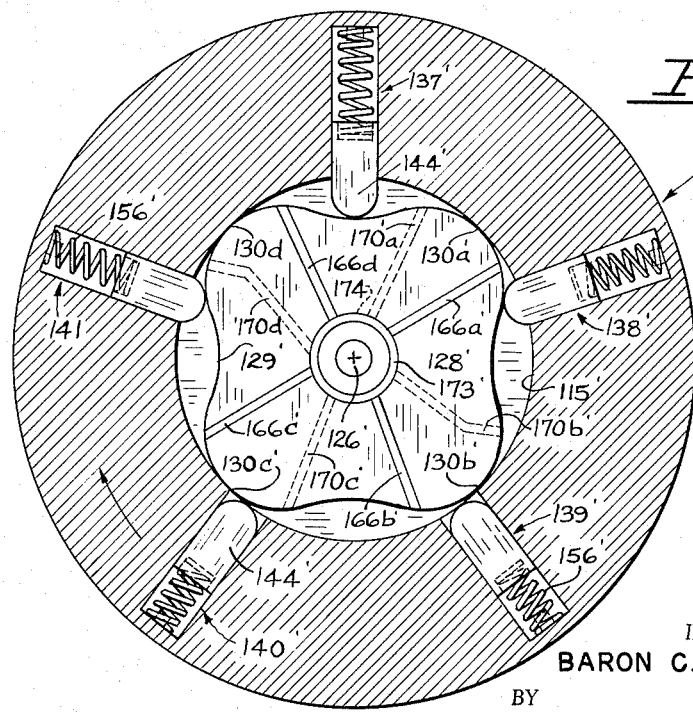
FIGURE 7 is a cross sectional view of a modification of my invention.

Referring to FIGURE 7, a modification of the motor of FIGURES 5 and 6 is shown in which a casing 112' having an internal arcuate surface 115' is formed with five slots 137', 138', 139', 140' and 141'. Mounted on a central shaft 126' is a lobed body 128' having four lobes 130a', 130b', 130c' and 130d uniformly spaced around the peripheral surface 129' of the lobed body. Each of the lobes is adapted on the outer surface thereof for non-contacting fluid-sealing relation with arcuate surface 115'. As in the embodiment of FIGURES 5 and 6, each slot 137'–141' is provided with a vane 144' biased into contact with peripheral surface 129' by a compression spring 156' provided in each slot. In the manner of FIG. 6 end closure plates and bearing for shaft 126' are also provided.

Lobed body 128' is formed with four fluid conduits 166a', 166b', 166c' and 166d which communicate fluid under pressure from a central annular conduit 173' to which pressurized fluid is supplied through passages formed in shaft 126' similar to those of FIGURE 6. Each of the fluid conduits 166a'–166d terminates on peripheral surface 129' adjacent one of the lobes and on the same side of each lobe relative to the direction or rotation of casing 112'. Also formed in lobed body 128' are exhaust fluid passages 170a', 170b', 170c' and 170d which convey fluid from peripheral surface 129' to a central annular conduit 174'. The operation and detailed construction of this embodiment is substantially identical to the embodiment of FIGURE 5; however, more compartments are provided with the result that smoother operation is obtained. However, since each compartment is smaller than the compartments of FIGURE 5, slightly less torque is realized for a motor of the same size. It should be understood that the embodiment depicted in FIGURES 1–4 can be provided with a lobed body 28 having four or more lobes and additional vanes in accordance with the teachings of FIGURE 7.

In each of the fluid motors described hereinabove, the diameter of the lobed body and the width thereof can be altered to provide almost any desired amount of torque. For example, provision of a lobed body having three lobes, an outer diameter of 13 feet, and a thickness of 5 feet, and being so shaped that the vanes travel 1 foot from their extended and to their retracted positions, affords a motor producing approximately 2,000,000 ft.-lbs. torque.

While two embodiments of my invention have been shown and described it will be obvious that other adaptations and modifications can be made without departing from the true spirit and scope of the invention.

I claim:

1. A rotary fluid motor comprising a casing having a smooth arcuate internal surface contoured symmetrically with respect to an axis and opposing internal side surfaces formed symmetrically with respect to the same axis, said side surfaces closing opposite ends of said arcuate surface to form a chamber, a shaft journaled for coaxial rotation with the axis and with respect to said chamber, a body in said chamber mounted on said shaft for rotation relative said casing, said body having side surfaces in non-contacting fluid-sealing relation to the interior surfaces of said casing chamber, said body having a peripheral surface extending between said side surfaces, said peripheral surface being formed with a plurality of lobes uniformly spaced therearound, said lobes having outer extremities adapted for non-contacting fluid-sealing relation to said arcuate surface, said casing being formed with a plurality of radially extending slots opening onto said arcuate surface, each said lobe having an area for non-contacting fluid-sealing relation with said arcuate surface sufficiently large to close the slot opening when the lobe is opposite said slot, said slots being uniformly spaced around said arcuate surface and being more numerous than said lobes, a vane having opposing smooth faces for slidably supporting a vane in each said slot, each said vane having an end surface for bearing in fluid-sealing relation against said peripheral body surface, said vanes having side surfaces adapted for non-contacting fluid-sealing cooperation with the internal side surfaces of said chamber casing, means for biasing said vanes into fluid sealing contact with said peripheral body surface, whereby there are formed plural fluid pressure compartments each bounded by a portion of the arcuate chamber surface, the peripheral body surface and a vane face, said compartments being alternately and sequentially transmutable through a power phase and an exhaust phase in response to rotation of said body relative said casing, an inlet formed in each said vane for pressurized fluid communication to each said compartment during the power phase thereof, and an exhaust outlet formed in said vane for fluid communication from each said compartment during the exhaust phase thereof, whereby fluid pressure in compartments in the power phase causes expansion of said compartments with consequent rotation of said body relative said casing and causes exhaust of fluid from compartments in the exhaust phase.

2. A rotary fluid motor according to claim 1 wherein said chamber is formed with an internal cylindric surface and said opposing internal side surfaces are substantially flat and normal to the central axis of said cylindric surface.

3. A fluid motor according to claim 1 wherein said body has three lobes and said casing has four vane supporting slots formed therein.

4. A rotary fluid motor comprising a casing forming a chamber with a smooth arcuate internal surface contoured symmetrically with respect to an axis and opposing side surfaces formed symmetrically with respect to the same axis, a shaft journaled for rotation on the axis, a body in said chamber affixed to said shaft for rotation therewith, said body having side surfaces in non-contacting fluid-sealing relation to the side surfaces of said chamber and a peripheral surface extending between said body side surfaces, said peripheral surface forming at least two lobes spaced uniformly therearound, said lobes having outer peripheral surfaces adapted for non-contacting fluid-sealing relation to said internal arcuate surface over a first area, said casing being formed with a plurality of radially extending slots opening onto said internal arcuate surface over a second area smaller than said first area so that communication between said slot and said chamber is interrupted when each lobe is opposite said slot, said slots being uniformly spaced around last said surface and being greater in number by one than the number of lobes on said body, a vane having opposed faces for slidably supporting a vane in each said slot, each said vane having on an end thereof a surface for bearing in fluid-sealing relation upon the peripheral surface of said body, means for radially biasing each said vane into contact on the bearing surface thereof with said peripheral body surface, means forming first fluid conduits through each said vane into said chamber, each said first conduit terminating in said chamber on one face on each said vane, said faces on which said first conduits terminate being on the same side of respective vanes relative the direction of rotation of said body, means forming second fluid conduits through each said vane from said chamber, each said second conduit terminating in said chamber on opposite faces of said vanes, and means for applying fluid under pressure to said first conduits, whereby said body is rotated by fluid pressure acting upon said lobes and fluid communication between said chamber and said conduits is interrupted when said lobe is opposite said vane slot.

5. A rotary fluid motor comprising a casing forming a smooth arcuate internal surface contoured symmetrically with respect to an axis and opposing side surfaces formed symmetrically with respect to the same axis, said side surfaces adapted to close opposite ends of said arcuate surface to form a chamber, a shaft journaled for rotation on the axis, a body in said chamber mounted on said shaft for rotation therewith, said body having side surfaces in non-contacting fluid-sealing relation to the side surfaces of said chamber and a peripheral surface extending between said body side surfaces, said peripheral body surface forming at least two lobes spaced uniformly therearound, said lobes having outer peripheral surfaces adapted for non-contacting fluid-sealing relation to said internal arcuate surface over a first area, said casing being formed with a plurality of radially extending slots opening onto said internal arcuate surface over a second area so that each lobe sequentially closes each slot when the lobe is opposite the slot, said slots being uniformly spaced around last said surface and being greater in number by one than the number of lobes on said body, a vane having opposed faces for slidably supporting a vane in each said slot, each said vane having on an end thereof a surface for bearing in fluid sealing relation upon the peripheral surface of said body, means for radially biasing each said vane into contact on the bearing surface thereof with said peripheral body surface, each said vane further having formed therein a first fluid conduit terminating in one vane face adjacent said bearing surface and a second fluid conduit terminating in the opposed vane face adjacent said bearing surface, the termination of each said first fluid conduits being disposed on the same face of respective vanes relative to the direction of rotation of said body, means for supplying fluid under pressure to said first conduits, and means communicating said second fluid conduits exterior of said casing, whereby introduction of pressurized fluid through said first conduits causes rotation of said body, thereby to expel fluid through said second conduits and said fluid communicating means.

6. A rotary fluid motor comprising a casing having an internal cylindric surface and a pair of plates mounted on said casing forming interiorly opposing flat surfaces normal to the central axis of said cylindric surface, said plates being adapted to close said cylindric surface to form a chamber, a shaft journaled on said plates for rotation upon the central axis of said cylindric surface, a body in said chamber fixedly mounted on said shaft, said body having flat side surfaces adapted for non-contacting fluid-sealing movement relative said interior plate surfaces and having three uniformly spaced radially extending lobes about the periphery thereof, each said lobe having peripheral surfaces thereon in non-contacting fluid-sealing relation to said internal cylindric surface, said casing being formed with four uniformly spaced apart slots opening onto said cylindric surface, each said slot having parallel opposed surfaces therein, a vane having opposed side faces for reciprocally slidably engaging said slot surfaces, each said vane having an outer end formed for slidable fluid seal relation to said body periphery, means for biasing each said vane into contact on outer end surface thereof with said body periphery, each said vane formed with first and second passages therein, each said first passage terminating in an orifice on a respective vane face, the vane faces on which said first conduits terminate each being on the same side of respective vanes relative the direction of body rotation, each said vane also being formed with a second passage terminating in the opposite vane face opposite the face on which said first passage terminates, said casing having an outer cylindric surface substantially concentric with said inner cylindric surface, said outer cylindric surface being formed with first and second spaced apart grooves therearound, means circumscribing said outer cylindric surface for closing said grooves to form first and second fluid ducts, a plurality of tubes mounted in said casing extending radially from said first and second ducts into said first and second vane passages respectively, each said tube having an exterior surface in sliding fluid-sealing engagement with said vane passages, means for conveying fluid under pressure to said first duct, and means for exhausting fluid from said second duct, whereby compartments are formed on opposite sides of each said vane, said compartments being bounded by a vane face, the body periphery and the internal cylindric chamber surface, and whereby each alternate compartment is in communication with said first vane passage terminations to cause rotation of said body and the other alternate compartments are in communication with said second vane passage termination to exhaust fluid from last said compartments.

References Cited by the Examiner

UNITED STATES PATENTS

| | | | |
|---|---|---|---|
| 126,203 | 4/1872 | Hardy et al. | 91—73 |
| 265,082 | 9/1882 | Hopkins | 91—104 |
| 368,927 | 8/1887 | Bright | 91—104 |
| 415,456 | 11/1889 | Harris | 91—104 |
| 502,818 | 8/1893 | Holland | 91—73 |
| 646,419 | 4/1900 | Doran | 91—73 |
| 713,448 | 11/1902 | Kalbach | 91—73 |
| 869,971 | 11/1907 | Korhonen | 91—105 |
| 934,968 | 9/1909 | Harman | 91—73 |
| 1,111,053 | 9/1914 | Biggs | 91—105 |
| 1,235,786 | 8/1917 | Fleming | 123—14 |
| 1,518,812 | 12/1924 | Olson | 91—73 |
| 2,099,193 | 11/1937 | Brightwell | 91—73 |
| 2,645,902 | 7/1953 | Pyle | 91—73 |
| 3,016,020 | 1/1962 | Rineer | 91—73 |
| 3,066,476 | 12/1962 | Conrad | 91—106 |

DONLEY J. STOCKING, *Primary Examiner.*

WILBUR J. GOODLIN, *Examiner.*